(12) United States Patent
Chang

(10) Patent No.: US 6,296,200 B1
(45) Date of Patent: Oct. 2, 2001

(54) FLY FISHING REEL

(75) Inventor: Liang-Jen Chang, No. 23, Lane 184-15, Hsin-Ping Rd., Tai-Ping City, Taichung Hsien (TW)

(73) Assignee: Liang-Jen Chang, Tai-Ping (TW)

( * ) Notice: Subject to any disclaimer, the term of this patent is extended or adjusted under 35 U.S.C. 154(b) by 0 days.

(21) Appl. No.: 09/586,547

(22) Filed: May 31, 2000

(51) Int. Cl.[7] .................................................. A01K 89/015
(52) U.S. Cl. ........................ 242/317; 242/296; 242/303; 242/306
(58) Field of Search ..................... 242/246, 286, 242/296, 302, 303, 304, 306, 307, 317

(56) References Cited

U.S. PATENT DOCUMENTS

| | | | |
|---|---|---|---|
| 1,470,640 | * 10/1923 | Pelletier | 242/307 |
| 2,116,581 | * 5/1938 | Moor | 242/296 |
| 2,858,998 | * 11/1958 | Nadolskey | 242/303 |
| 4,461,435 | 7/1984 | Kovalovsky . | |
| 4,728,054 | * 3/1988 | Pisapio | 242/307 |
| 5,482,221 | 1/1996 | Peterson . | |
| 5,626,303 | 5/1997 | Bringsen . | |
| 5,921,492 | * 7/1999 | Bauer | 242/317 |
| 5,988,547 | * 11/1999 | Koelewyn | 242/246 |

FOREIGN PATENT DOCUMENTS 2181331   4/1987  (GB) .
2203211   10/1988 (GB) .

* cited by examiner

*Primary Examiner*—Emmanuel M. Marcelo
(74) *Attorney, Agent, or Firm*—Christensen O'Connor Johnson Kindness PLLC

(57) ABSTRACT

A fly fishing reel includes a fishing-rod connecting member, a main shaft, a spool, a retaining member, a brake device, and a drag adjustment device. The main shaft exetends rotatably through a central hole in the connecting member, and has a left end, a right end, and an outward flange that extends radially and outwardly from the main shaft near the left end. The spool is sleeved on the main shaft so as to rotate synchronously therewith, and is provided with a handle. The retaining member is mounted removably on the right end of the main shaft, and is disposed adjacent to the handle for retaining the connecting member and the spool between the outward flange of the main shaft and the retaining member. The retaining member can be removed from the main shaft for replacement of the spool. The brake device is disposed between the left end of the main shaft and the connecting member for stopping rotation of the main shaft within the connecting member when a force applied to the handle is released. The drag adjustment device includes a rotary knob, which engages threadedly the connecting member near the left end of the main shaft so as to rotate relative to the connecting member for adjusting drag resisting rotation of the main shaft within the connecting member.

8 Claims, 6 Drawing Sheets

FLY FISHING REEL

BACKGROUND OF THE INVENTION

1. Field of the Invention

The invention relates to a fly fishing reel, more particularly to a fly fishing reel that is convenient and safe to operate.

2. Description of the Related Art

Fly fishing is a popular form of recreational activity, and there is a wide variety of fly fishing equipment and peripheral products available in the market. When purchasing fly fishing equipment, consumers tend to focus more and more on the ergonomic aspect of the products, in addition to the practical aspect thereof.

FIG. 1 shows a conventional fly fishing reel. As shown, the conventional fly fishing reel includes a fishing-rod connecting member 1, a main shaft 2 extending axially from a center of the fishing-rod connecting member 1, a plastic pawl 2C fitted onto a central shaft at an end portion of the main shaft 2, a spring 2B retained at the end portion of the main shaft 2, and a spool 3 sleeved rotatably on the main shaft 2. An O-ring 4, a tapered washer 5, and an internally threaded knob 6 are mounted in sequence on a threaded section 2A of the main shaft 2 that projects from an outer end of the spool 3. An inner periphery of the spool 3 is formed with an annular toothed surface 3A for engaging the pawl 2C so as to create a clicking sound during rotation of the main shaft 2. The spool 3 is further provided with a handle 3B at the outer end thereof. By rotating the knob 6, drag resistance on the spool 3 can be adjusted. In other words, when the knob 6 is turned in one direction, the tapered washer 5 can be pushed to press against the O-ring 4 so as to increase the area of friction between the O-ring 4 and the spool 3 to thereby achieve a greater drag force on the spool 3. Hence, when the spool 30 rotates, it is subjected to the drag force, so that rotation of the spool 3 can be instantly stopped when an external force applied thereto is released. Besides, the contact between the pawl 2C and the annular toothed surface 3A provides additional drag on rotation of the spool 3. However, although the conventional fly fishing reel described above permits adjustment of drag on the spool 3, it suffers from certain drawbacks, as set forth below:

1. When the fisherman grips a fishing rod with one hand, and holds the spool 3 with the other hand, since the handle 3B and the knob 6 are located on the same side of the fly fishing reel, and since the knob 6 is disposed at a center of rotation of the handle 3B, when the line is pulled by a fish and starts to run, the fisherman will normally rotate the knob 6 to create a drag force on the line to slow down the running of the line and prevent breaking of the same. However, since the fisherman's fingers or palm will naturally rub against the outer end of the fast-turning spool 3 during drag adjustment, the fisherman's hand may be injured. Besides, if the fisherman wishes to tighten the knob 6 for adjustment purposes, his fingers may be hit by the fast-turning handle 3B.

2. As the O-ring 4 wears easily, the drag effect is weakened. Moreover, since the area of contact between the O-ring 4 and the spool 3 is small, the braking effect is not satisfactory. Furthermore, the fisherman is unable to feel the amount of displacement of the knob 6 by the rotation thereof during drag adjustment.

SUMMARY OF THE INVENTION

Therefore, the main object of the present invention is to provide a fly fishing reel that is convenient and safe to operate, and that utilizes a dual disk type braking mechanism to provide a large braking surface area, and that enables the fisherman to feel the amount of displacement of the braking mechanism.

Accordingly, a fly fishing reel of the present invention includes a fishing-rod connecting member, a main shaft, a spool, a retaining member, a brake device, and a drag adjustment device. The fishing-rod connecting member has a central hole formed therethrough. The main shaft extends rotatably through the central hole in the fishing-rod connecting member, and has a left end, a right end, and an outward flange that extends radially and outwardly from the main shaft near the left end. The spool is sleeved on the main shaft so as to rotate synchronously therewith, and is provided with a handle. The retaining member is mounted removably on the right end of the main shaft, and is disposed adjacent to the handle for retaining the fishing-rod connecting member and the spool between the outward flange of the main shaft and the retaining member. The retaining member is capable of being removed from the main shaft for replacement of the spool. The brake device is disposed between the left end of the main shaft and the fishing-rod connecting member for stopping rotation of the main shaft within the fishing-rod connecting member when a force applied to the handle is released. The drag adjustment device includes a rotary knob, which engages threadedly the fishing-rod connecting member near the left end of the main shaft so as to rotate relative to the fishing-rod connecting member for adjusting drag resisting rotation of the main shaft within the fishing-rod connecting member.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
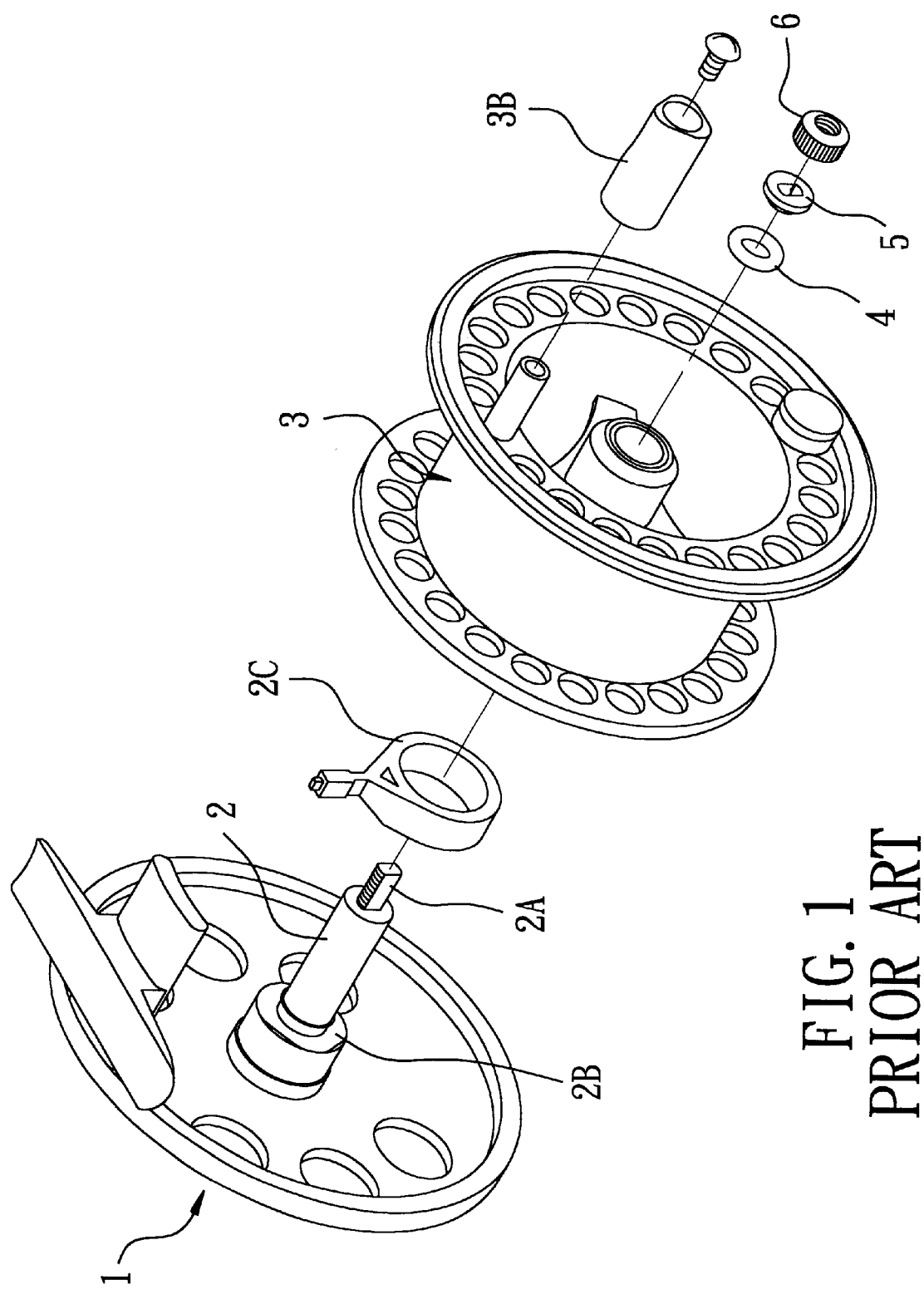
FIG. 1 is a partly exploded perspective view of a conventional fly fishing reel.
Figure 2:
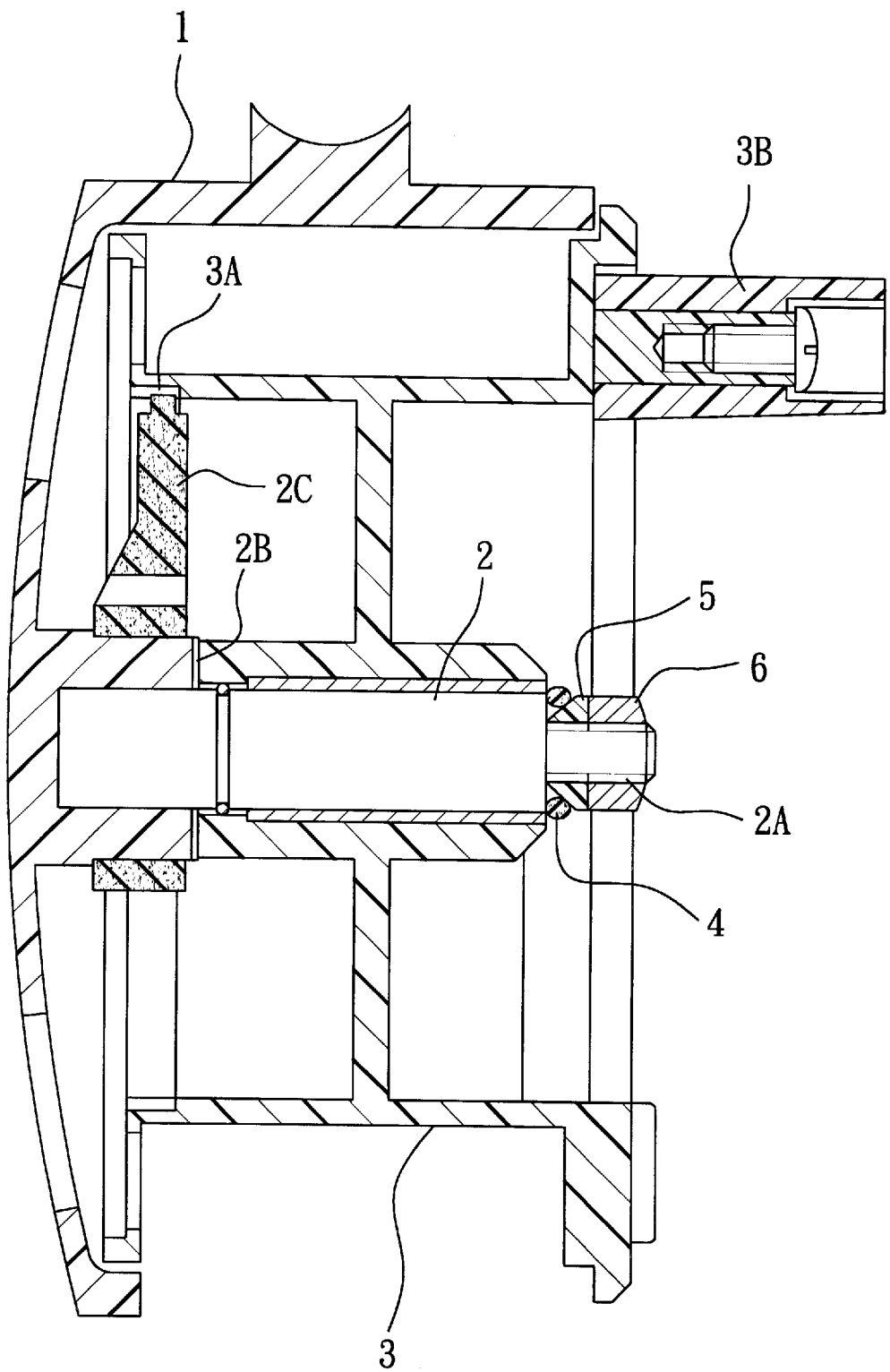
FIG. 2 is an assembled sectional view of the conventional fly fishing reel.
Figure 3:
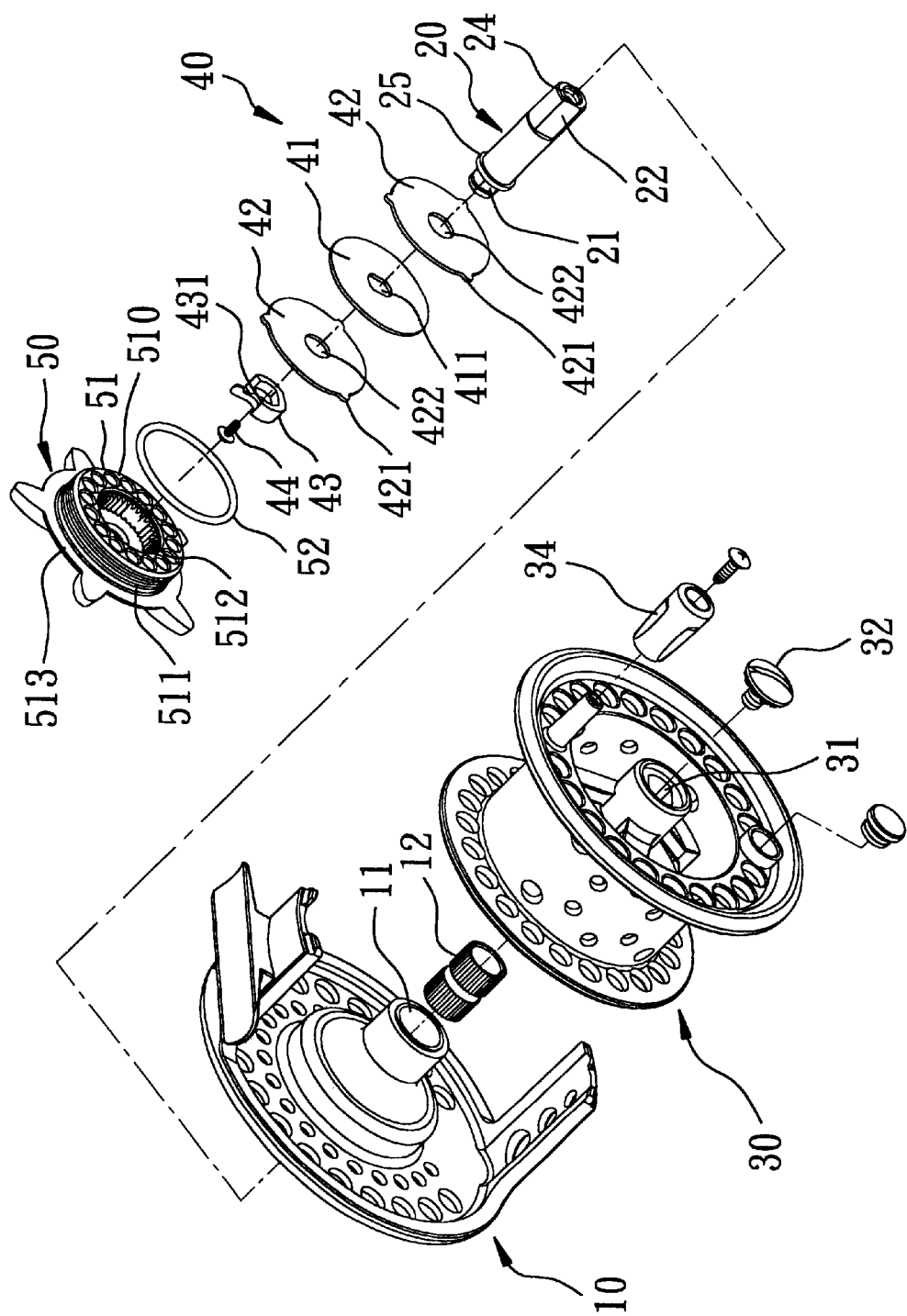
FIG. 3 is an exploded perspective view of a preferred embodiment of a fly fishing reel according to the present invention.
Figure 4:
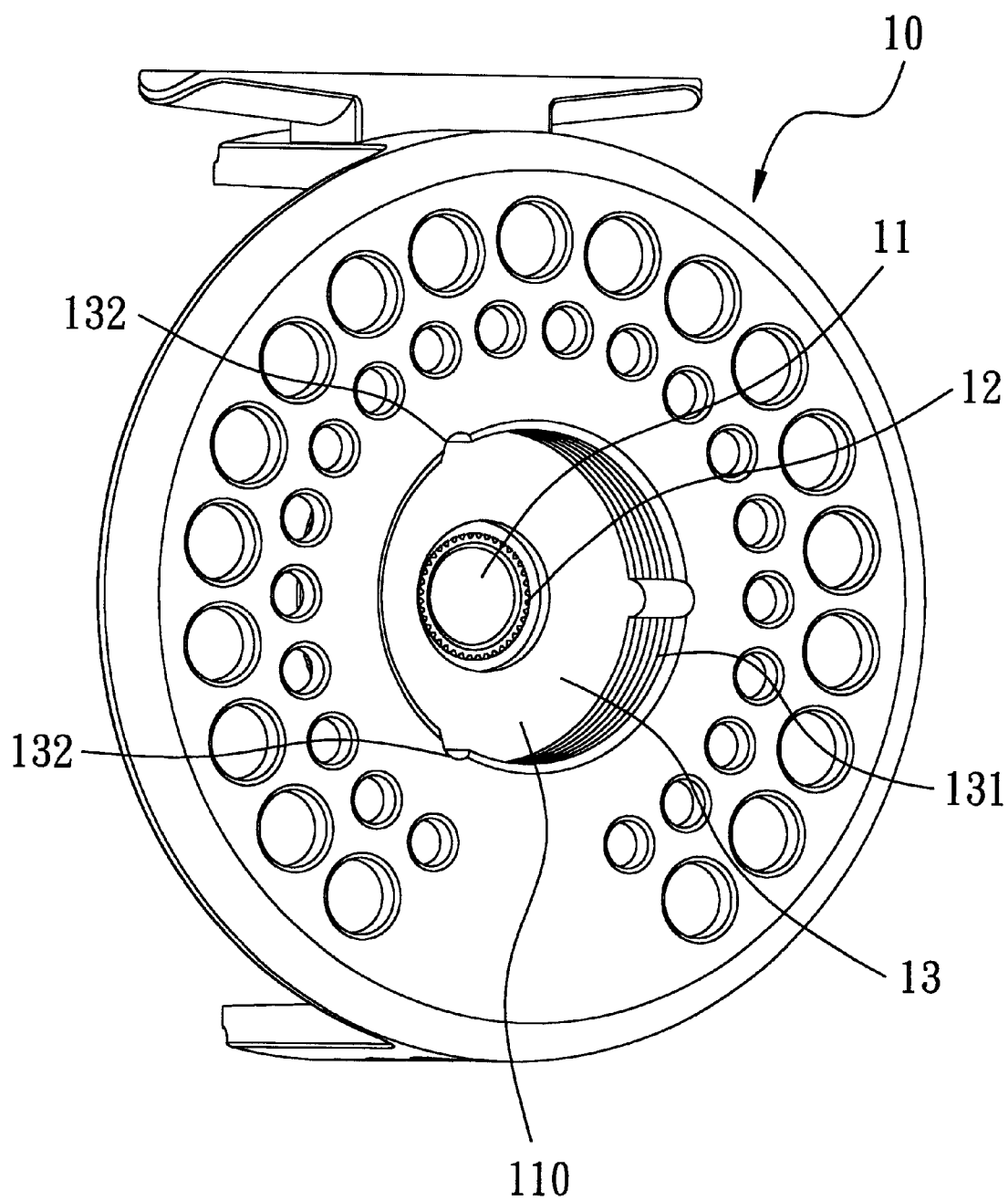
FIG. 4 is schematic view of the preferred embodiment, illustrating a left side of a fishing-rod connecting member.
Figure 5:
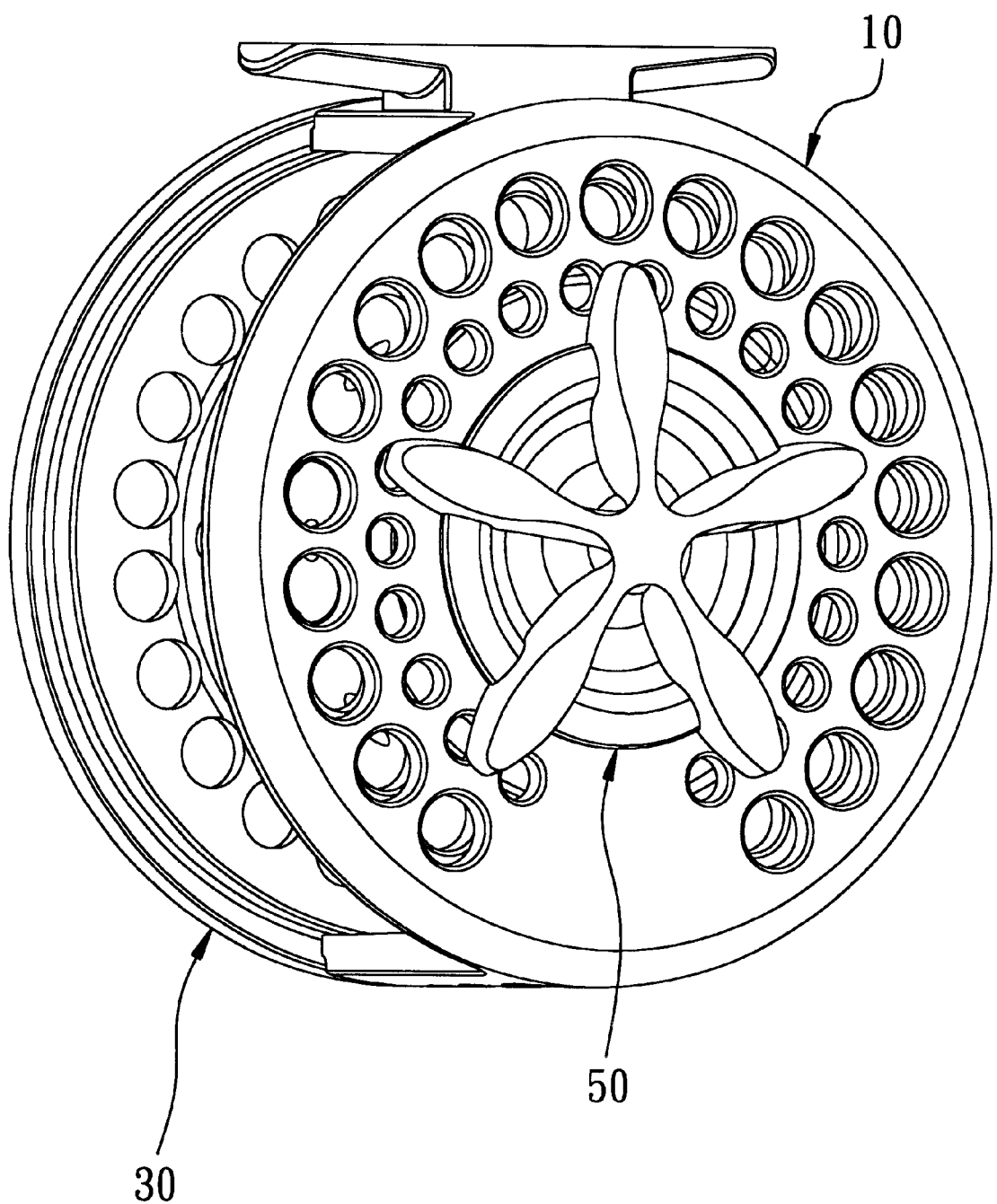
FIG. 5 is an assembled perspective view of the preferred embodiment.

Referring to FIGS. 3, 4 and 5, the preferred embodiment of a fly fishing reel according to the present invention is shown to include a fishing-rod connecting member 10, a main shaft 20, a spool 30, a retaining member 32, a brake device 40, and a drag adjustment device 50.

The fishing-rod connecting member 10 has a central hole 11 formed therethrough. In addition, the fishing-rod connecting member 10 is formed with an injection molded copper bushing 12, which is fixed in the central hole 11 for extension of the main shaft 20 therethrough, and has an internally threaded portion 131. The central hole 11 in the fishing-rod connecting member 10 is shaped as a counterbore, which has an enlarged left end portion 110 that is defined by a shoulder 13. The fishing-rod connecting member 10 has a plurality of keyways 132 in an inner wall that defines the enlarged left end portion 110 of the central hole 11.

The main shaft 20 extends rotatably through the central hole 11 in the fishing-rod connecting member 10, and has a left end, a right end, and an outward flange 25 that extends radially and outwardly from the main shaft 20 near the left end. The right end of the main shaft 20 has an end surface that is formed with a right threaded hole 24. The left end of the main shaft 20 has an end surface that is formed with a left threaded hole 23. The main shaft 20 further has generally polygonal-cross-sectioned left and right end portions 21, 22.

The spool 30 is sleeved on the main shaft 20 so as to rotate synchronously therewith, and is provided with a handle 34. The spool 30 has a central hole 31 that is formed therethrough, and that has a generally polygonal cross-section. The generally polygonal-cross-sectioned right end portion 22 of the main shaft 20 engages fittingly the central hole 31 in the spool 30 for synchronous rotation with the spool 30.

The retaining member 32 is mounted removably on the right end of the main shaft 20 for retaining the fishing-rod connecting member 10 and the spool 30 between the outward flange 25 of the main shaft 20 and the retaining member 32. The retaining member 32 is capable of being removed from the main shaft 20 for replacement of the spool 30, and is shaped as a bolt that engages the right threaded hole 24 in the main shaft 20.

The brake device 40 includes a middle drag washer 41 and two side drag washers 42, and is disposed between the left end of the main shaft 20 and the fishing-rod connecting member 10 for stopping rotation of the main shaft 20 within the fishing-rod connecting member 10 when a force applied to the handle 34 of the spool 30 is released. The middle drag washer 41 is formed with a central hole 411 of a generally polygonal cross-section for extension of the polygonal-cross-sectioned left end portion 21 of the main shaft 20 therethrough. The central hole 411 in the middle drag washer 41 complements the polygonal-cross-sectioned left end portion 21 of the main shaft 20 so as to rotate the middle drag washer 41 synchronously with the main shaft 20. Each of the side drag washers 42 is formed with a circular hole 422 and is sleeved rotatably on the polygonal-cross-sectioned left end portion 21 of the main shaft 20. The two side drag washers 42 are disposed to sandwich the middle drag washer 41 therebetween. In addition, each of the side drag washers 42 has an outer periphery, which is formed with a plurality of integral key projections 421 that engage respectively the keyways 132 in the fishing-rod connecting member 10 to prevent rotation of the side drag washers 42 within the fishing-rod connecting member 10. The brake device 40 further includes a unitary plastic pawl 43 having a hole 431 formed therethrough, and a bolt 44 extending through the hole 431 in the pawl 43 to engage the left threaded hole 23 in the main shaft 20 so as to fasten the pawl 43 onto the main shaft 20. As such, the middle and side drag washers 41, 42 are retained between the pawl 43 of the brake device 40 and the shoulder 13 of the fishing-rod connecting member 10.

The drag adjustment device 50 includes a rotary knob 51, which engages threadedly the fishing-rod connecting member 10 near the left end of the main shaft 20 so as to rotate relative to the fishing-rod connecting member 10 for adjusting drag resisting rotation of the main shaft 20 within the fishing-rod connecting member 10. The rotary knob 51 has an externally threaded portion 511 that engages the internally threaded portion 131 of the fishing-rod connecting member 10, and an annular right portion 510 that is formed with a toothed inner surface 512, and that abuts against one of the side drag washers 42 of the brake device 40. By means of the rotary knob 51, the two side drag washers 42 together with the middle drag washer 41 are pressed against the shoulder 13 of the fishing-rod connecting member 10. The rotary knob 51 further has a left end with an outward flange 513 that extends radially and outwardly therefrom, and that is formed integrally with the annular right portion 510. The drag adjustment device 50 further includes an O-ring 52 that is made of rubber, and that is sleeved on the annular right portion 510 between the outward flange 513 of the rotary knob 51 and the fishing-rod connecting member 10, thereby preventing contact therebetween. The O-ring 52 is clamped between the outward flange 513 of the rotary knob 51 and the fishing rod-connecting member 10 when the middle and side drag washers 41, 42 are clamped between the annular right portion 510 of the rotary knob 51 and the shoulder 13 of the fishing-rod connecting member 10. The pawl 43 of the brake device 40 is disposed inside the rotary knob 51. During rotation of the pawl 43 within the rotary knob 51, the pawl 43 engages the toothed inner surface 512 of the rotary knob 51 so as to make a clicking noise, and to create drag on rotation of the main shaft 20 within the fishing-rod connecting member 10.

Figure 6:
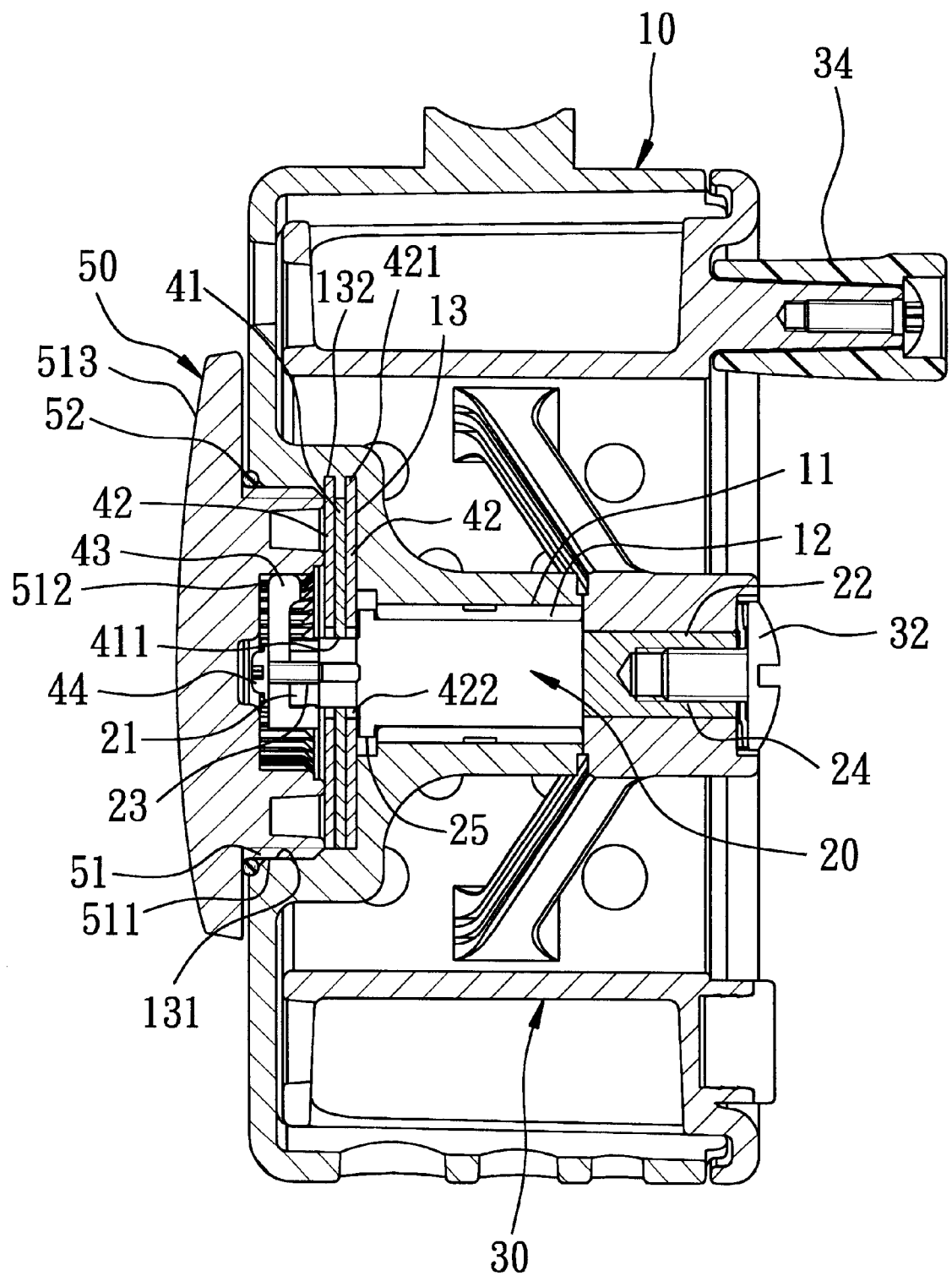
FIG. 6 is a schematic view of the preferred embodiment.

Referring to FIG. 6, since the main shaft 20 has the right end portion 22 engaging fittingly the central hole 31 in the spool 30, and the left end portion 21 engaging the central hole 411 in the middle drag washer 41 of the brake device 40, when the spool 30 rotates, the main shaft 20, the middle drag washer 41, and the pawl 43 are brought to rotate synchronously therewith. On the other hand, since the side drag washers 42 are formed with key projections 421 that engage the keyways 132 in the fishing-rod connecting member 10, they are prevented from rotating within the fishing-rod connecting member 10.

In use, when it is desired to adjust the degree of resistance to rotation of the spool 30, it is only necessary to rotate the rotary knob 51 of the drag adjustment device 50 so that the toothed inner surface 512 of the annular right portion 510 abuts against one of the side drag washers 42, whereby the assembly of the two drag side drag washers 42 and the middle drag washer 41 is pressed against the shoulder 13 of the fishing-rod connecting member 10. Since the middle drag washer 41 is sandwiched between the side drag washers 42, when the spool 30 rotates the main shaft 20 and the middle drag washer 41, a dual disk-type braking surface of a large area can be achieved. Hence, the drag resisting rotation of the rotation of the spool 30 can be adjusted. At the same time, the pawl 43 is disposed to be in constant contact with the toothed inner surface 512 of the rotary knob 51. As such, rotation of the spool 30 can be stopped instantly when a force applied thereto is released.

In sum, the present invention has the following advantages:

1. Since adjustment of the resistance to rotation of the spool 30 is performed by operating the rotary knob 51 to the left of the fishing-rod connecting member 10 to cause the two side drag washers 42 to clamp the middle drag washer 41 therebetween so as to achieve a large braking surface, and since the handle 31 of the spool 30 is located to the right of the fishing-rod connecting member 10, when a game fish is hooked and the line starts to run, the fisherman can manipulate the rotary knob 51 of the drag adjustment device 50 to brake the outward running of the line so as to control play of the fish. Therefore, it can be appreciated that the fly fishing reel of the present invention permits convenient and safe drag adjustment.

2. Since the brake device 40 of the present invention is disposed between the main shaft 20 and the fishing-rod connecting member 10, and includes two side drag washers 42 and a middle drag washer 41 to achieve a large braking surface, the drag washers are relatively durable and will not easily slip out. Hence, the drag effect is improved. In addition, when it is desired to change or replace the spool 30, it is only necessary to loosen the retaining member 32. Besides, during changing or replacement of the spool 30, since the outward flange 25 of the main shaft 20 abuts against the fishing-rod connecting member 10, the main shaft 20 will not slip out from the fishing-rod connecting member 10.

3. As the braking surface provided by the brake device 40 is large, the present invention is not only safe to operate, but the amount of displacement of the rotary knob 51 of the drag adjustment device 50 can also be clearly felt to assist the fisherman's control of the spool 30.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A fly fishing reel comprising:
a fishing-rod connecting member having a central hole formed therethrough;
a main shaft extending rotatably through said central hole in said fishing-rod connecting member, and having a left end, a right end, and an outward flange that extends radially and outwardly from said main shaft near said left end;
a spool, which is sleeved on said main shaft so as to rotate synchronously therewith and which is provided with a handle;
a retaining member mounted removably on said right end of said main shaft and disposed adjacent to said handle for retaining said fishing-rod connecting member and said spool between said outward flange of said main shaft and said retaining member, said retaining member being capable of being removed from said main shaft for replacement of said spool;
a brake device disposed between said left end of said main shaft and said fishing-rod connecting member for stopping rotation of said main shaft within said fishing-rod connecting member when a force applied to said handle is released; and
a drag adjustment device including a rotary knob, which engages threadedly said fishing-rod connecting member near said left end of said main shaft so as to rotate relative to said fishing-rod connecting member for adjusting drag resisting rotation of said main shaft within said fishing-rod connecting member.

2. The fly fishing reel as claimed in claim 1, wherein said right end of said main shaft has an end surface that is formed with a right threaded hole, said retaining member being shaped as a bolt that engages said right threaded hole in said main shaft.

3. The fly fishing reel as claimed in claim 1, wherein said fishing-rod connecting member is formed with an injection molded copper bushing, which is fixed in said central hole in said fishing-rod connecting member for extension of said main shaft therethrough.

4. The fly fishing reel as claimed in claim 1, wherein said fishing-rod connecting member has an internally threaded portion, said rotary knob having an externally threaded portion that engages said internally threaded portion of said fishing-rod connecting member.

5. The fly fishing reel as claimed in claim 1, wherein said spool has a central hole that is formed therethrough and that has a generally polygonal cross-section, said main shaft having a generally polygonal-cross-sectioned right end portion that engages fittingly said central hole in said spool for synchronous rotation with said spool.

6. The fly fishing reel as claimed in claim 1, wherein said central hole in said fishing-rod connecting member is shaped as a counterbore, which has an enlarged left end portion that is defined by a shoulder, said fishing-rod connecting member having a plurality of keyways in an inner wall that defines said enlarged left end portion of said central hole in said fishing-rod connecting member, said main shaft having a generally polygonal-cross-sectioned left end portion, said brake device including:
a middle drag washer formed with a central hole of a generally polygonal cross-section for extension of said generally polygonal-cross-sectioned left end portion of said main shaft therethrough, said central hole in said middle drag washer complementing said generally polygonal-cross-sectioned left end portion of said main shaft so as to rotate said middle drag washer synchronously with said main shaft; and
two side drag washers sleeved rotatably on said main shaft and sandwiching said middle drag washer therebetween, each of said side drag washers having an outer periphery, which is formed with a plurality of integral key projections that engage respectively said keyways in said fishing-rod connecting member, thereby preventing rotation of said side drag washers within said fishing-rod connecting member, assembly of said middle and side drag washers being pressed against said shoulder of said fishing-rod connecting member by means of said rotary knob of said drag adjustment device.

7. The fly fishing reel as claimed in claim 6, wherein said rotary knob has an annular right portion that is formed with a toothed inner surface and that abuts against one of said side drag washers, said left end of said main shaft having an end surface that is formed with a left threaded hole, said brake device further including:
a unitary plastic pawl disposed within said rotary knob and having a hole formed therethrough; and
a bolt extending through said hole in said pawl to engage said left threaded hole in said main shaft so as to fasten said pawl onto said main shaft, thereby retaining said middle and side drag washers between said pawl and said shoulder of said fishing-rod connecting member, said pawl engaging said toothed inner surface of said rotary knob so as to make a clicking noise during rotation of said pawl within said rotary knob, and to create drag on rotation of said main shaft within said fishing-rod connecting member.

8. The fly fishing reel as claimed in claim 7, wherein said rotary knob has a left end with an outward flange that extends radially and outwardly therefrom and that is formed integrally with said annular right portion of said rotary knob, said drag adjustment device further including an O-ring that is made of rubber and that is sleeved on said annular right portion between said outward flange of said rotary knob and said fishing-rod connecting member, thereby preventing contact therebetween, said O ring being clamped between said outward flange of said rotary knob and said fishing-rod connecting member when said middle and side drag washers are clamped between said annular right portion of said rotary knob and said shoulder of said fishing-rod connecting member.

* * * * *